United States Patent
Nagashima et al.

(10) Patent No.: US 6,492,480 B1
(45) Date of Patent: Dec. 10, 2002

(54) METHOD OF POLYMERIZING A SILALKYLENESILOXANE

(75) Inventors: Hideo Nagashima, Kasuga (JP); Kouki Matsubara, Kasuga (JP); Junichi Terasawa, Kasuga (JP)

(73) Assignee: Japan Science and Technology Corporation, Saitama-ken (JP)

( * ) Notice: Subject to any disclaimer, the term of this patent is extended or adjusted under 35 U.S.C. 154(b) by 0 days.

(21) Appl. No.: 09/868,877

(22) PCT Filed: Oct. 27, 2000

(86) PCT No.: PCT/JP00/07531

§ 371 (c)(1),
(2), (4) Date: Jun. 20, 2001

(87) PCT Pub. No.: WO01/30887

PCT Pub. Date: May 3, 2001

(30) Foreign Application Priority Data

Oct. 28, 1999 (JP) ............................................ 11-306522

(51) Int. Cl.[7] ........................ C08G 77/08; C08G 77/50

(52) U.S. Cl. ............................. 528/19; 528/33; 528/35; 528/12; 528/31; 528/37; 556/460; 556/136; 502/161

(58) Field of Search ............................. 528/33, 35, 12, 528/19, 31, 37; 556/460, 136; 502/161

(56) References Cited

U.S. PATENT DOCUMENTS 5,117,025 A * 5/1992 Takago et al.

* cited by examiner

Primary Examiner—Robert Dawson
Assistant Examiner—Kuo-Liang Peng
(74) Attorney, Agent, or Firm—Fay, Sharpe, Fagan, Minnich & McKee, LLP

(57) ABSTRACT

Disclosed is a method for the preparation of a linear polysilalkylenesiloxane from four- to seven-membered cyclic silalkylenesiloxane by subjecting the cyclic silalkylenesiloxane to ring opening polymerization by using as a catalyst a polynuclear ruthenium-carbonyl complex in which carbonyl groups are coordinated with three or four ruthenium atoms, in the presence of a silane compound having at least one Si—H bond.

5 Claims, 1 Drawing Sheet

METHOD OF POLYMERIZING A SILALKYLENESILOXANE

TECHNICAL FIELD

The present invention relates to technology for preparing a silicone compound (a polysiloxane) and, more particularly, to a novel method for the polymerization of a linear silalkylenesiloxane by subjecting the corresponding cyclic silalkylenesiloxane to ring opening polymerization.

BACKGROUND TECHNOLOGY

Silicone compounds (polysiloxanes) have excellent thermal resistance, high anti-weathering properties, and unique electrical properties, etc., so that they are used in diverse fields. Various attempts have also been made to attain improvements in their performance capabilities and properties. Polysilalkylenesiloxanes are one such group of silicone compounds having improved properties. Polysilalkylenesiloxanes are now drawing attention as polymers which, as compared with the dimethypolysiloxanes extensively utilized in various fields, have excellent resistance to acid, alkali and so on, and also remarkable mechanical strength, as they are produced by introducing silalkylene bonds such as silethylene bonds into the main siloxane chain moiety.

As a process for the preparation of polysilalkylehesiloxanes, there has been reported a process in which a cyclic silalkylenesiloxane is subjected to ring opening polymerization by means of anionic polymerization using lithium silanolate as an initiator under alkaline reaction conditions (B. Suryanarayanan et al., J. Polym. Sci., 12, 10891109 (1974)). Modified forms of the process include, e.g., a process for subjecting a cyclic silalkylenesiloxane to ring opening polymerization by using potassium silanolate as an initiator and divinylsiloxane as a chain transfer agent (Examined Japanese Patent Application Publication No. 15614/1994: Japanese Patent Application No. 178727/1990) and a process for the ring opening polymerization by using water as a chain transfer agent (Examined Japanese Patent Application Publication No. 62773/1994: Japanese Patent Application No. 178727/1990). The reaction operations of such prior art technologies are, however, laborious because they require the use of a chain transfer agent for regulating the molecular weight of the resulting product due to the fact that they are based on the living polymerization by the anionic polymerization under alkaline conditions.

DISCLOSURE OF THE INVENTION

The present inventors have found a novel method that can produce a linear polysiloxane from a cyclic siloxane compound by means of ring opening polymerization that is carried out using the silane compound and a particular transition metal catalyst under neutral conditions yet that does not require the use of any chain transfer agent.

Therefore, the present invention provides a method for the preparation of a linear polysilalkylenesiloxane having a repeating unit represented by the following general formula (4):

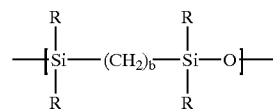

(where b is an integer of 1 to 4; and R is a hydrocarbon group of from 1 to 8 carbon atoms), which comprises subjecting a cylic silalkylenesiloxane represented by the following general formula (3):

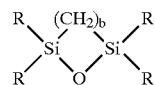

(where b and R have each the same meaning as above) to ring opening polymerization by using as a catalyst a polynuclear ruthenium-carbonyl complex with carbonyl groups coordinated with three or four ruthenium atoms, in the presence of a silane compound represented by the following general formula (1):

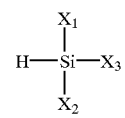

(where $X_1$, $X_2$ and $X_3$ are the same or different, each being a functional group or atom selected from a group consisting of hydrogen atom, a halogen atom, an amino group, an alkyl group, an alkoxy group, a thioalkyl group, an alkylamino group, an aryl group, an arylamino group, a vinyl group, a siloxy group, an organosiloxy group, an organo-silyl group and a heterocyclic group) or by the following general formula (2):

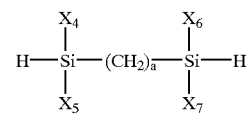

(where $X_1$, $X_5$, $X_6$ and $X_7$ are the same or different, each being a functional group or atom selected from a group consisting of hydrogen atom, a halogen atom, an amino group, an alkyl group, an alkoxy group, a thioalkyl group, an alkylamino group, an aryl group, an arylamino group, a vinyl group, a siloxy group, an organosiloxy group, an organo-silyl group and a heterocyclic group; and a is an integer of 1 to 4).

BEST MODES FOR CARRYING OUT THE INVENTION

Figure 1:
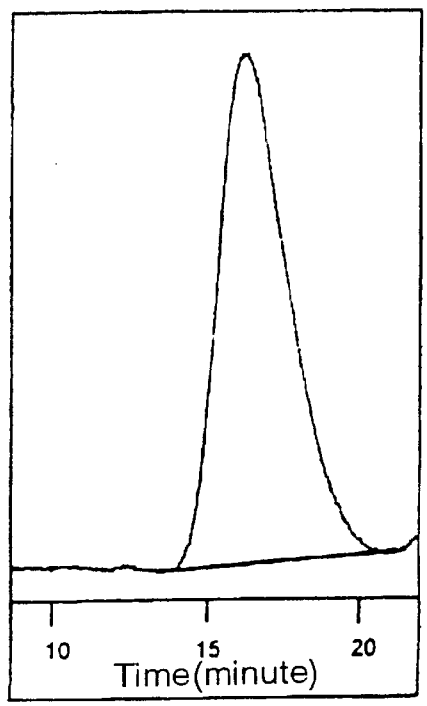
FIG. 1 is a GPC chart showing a polymer synthesized by the method according to the present invention.

The method according to the present invention can readily synthesize a linear polysilalkylenesiloxane by subjecting a corresponding cyclic silakylenesiloxane to ring opening polymerization in the presence of a combination of a silane compound and a catalyst composed of a polynuclear ruthenium-carbonyl complex with carbonyl groups coordinated with three or four ruthenium atoms. In other words, the method according to the present invention allows the production of the target polymer simply by using a catalytically effective amount of the ruthenium complex and a small amount of the silane compound. Further, this method can control the molecular weight of the resulting polymer in a relatively easy way simply by varying its reaction conditions. The details of the chemical structure and the preparation of the polynuclear ruthenium-carbonyl catalysts to be used in the present invention, etc. are disclosed in the literatures by the present inventors and others (H. Nagashima et al., J. Am. Chem. Soc., 115, 1043010431 (1993); H. Nagashima et al., Bull. Chem. Soc. Jpn., 71, 24412448 (1998); S. A R. Knox et al., J. Am. Chem. Soc., 97, 3942 (1975); M. I. Bruce et al., Inorg. Synth., 26, 262 (1989)).

The present invention can be said to be a unique case wherein the ring opening polymerization can be effected by using a transition metal catalyst. It should be noted, however, that such complex as $Co_2(CO)_8$, a well known transition metal-carbonyl complex, does not function as a reaction catalyst for the subject reaction.

The ruthenium-carbonyl complex to be used for the present invention has a stable polynuclear configuration, which contains a plurality of ruthenium atoms with carbonyl groups as ligands, and can provide a duster catalyst effective for the ring opening polymerization of a silalkylenesiloxane. More specifically, the polynuclear ruthenium-carbonyl complex applicable as a catalyst for the method of the present invention has a basic configuration wherein a plurality of carbonyl groups are coordinated with three or four ruthenium atoms. And the polynuclear ruthenium-carbonyl complex preferably contains a ligand composed of hydride and/or a polycyclic aromatic moiety such as acenaphthylene and azulene, in addition to the carbonyl ligands. The polynuclear ruthenium-carbonyl complex having such an additional ligand is particularly outstanding in its activity of ring opening polymerization with respect to silalkylenesiloxane. This activity is estimated to be imparted by the duster structure bridging the plural metals and the formation of an active metal due to the change in hapticity change as the reactants approach. Thus, the polynuclear ruthenium-carbonyl complex particularly useful as a catalyst to be used for the method of the present invention may be selected from the following formulas (5) to (9):

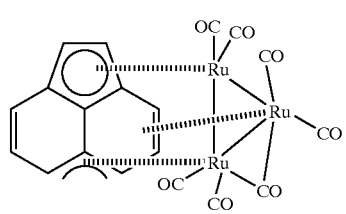
(5)

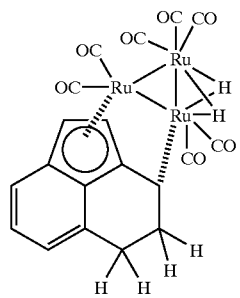
(6)

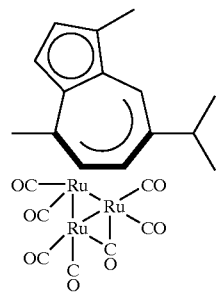
(7)

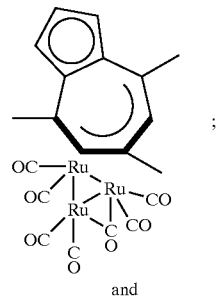
(8)

and

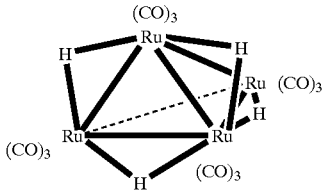
(9)

The ring opening polymerization to be carried out in the method of the present invention can be represented generally by the following reaction (I):

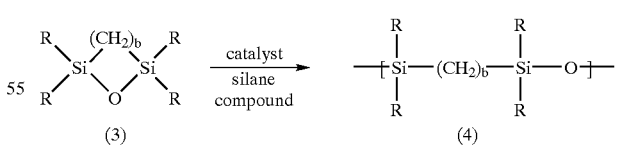
(I)

In the above reaction (1), the compound represented by the general formula (3) is a cyclic silalkylenesiloxane constituting a monomer to be used as a raw material, in which reference symbol b represents an integer of 1 to 4. Specifically, the method of the present invention is to provide a linear polymer, i.e., polysilalkylenesiloxane, having a repeating or recurring unit represented by the general formula (4) by subjecting a four- to seven-membered cyclic silalkylenesiloxane, such as silmethylenesiloxane, silethylenesiloxane, silpropylenesiloxane or silbutylenesiloxane, etc., to ring opening polymerization.

In the general formulas (3) and (4), reference symbol R means a hydrocarbon group of from 1 to 8 carbon atoms, which in turn means specifically a $C_1$–$C_8$ alkyl group, a $C_1$–$C_8$ alkenyl group, a $C_1$–$C_8$ cycloalkyl group, a $C_1$–$C_8$ aryl group, a $C_1$–$C_8$ aralkyl group, and so on. Among the $C_1$–$C_8$ hydrocarbon groups for reference symbol R, a lower alkyl group such as methyl, ethyl, propyl, etc. is preferred. Further, in the general formulas (3) and (4), the four $C_1$–$C_8$ hydrocarbon groups as indicated each by reference symbol R may be the same or different.

The method according to the present invention is particularly effective for the synthesis of a polysilalkylenesiloxane having a repeating unit represented by the formula (11):

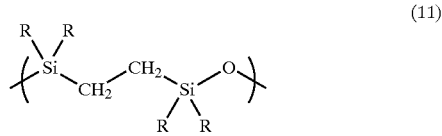

(11)

from a five-membered cylic silethyenesiloxane represented by the formula (10):

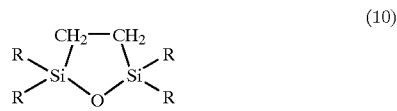

(10)

In the above formulas (10) and (11), reference symbol R is preferably methyl group.

The method according to the present invention can provide the target linear polymer by means of the ring opening polymerization of the corresponding cyclic siloxane in the presence of a particular catalyst and silane compound. As the particular catalyst, there may be used the polynuclear ruthenium-carbonyl complex as illustrated above.

As the silane compounds, there may be used those represented by the general formulas (1) or (2) above. Reference symbols $X_1$, $X_2$ and $X_3$ in the above general formula (1) as well as reference symbols $X_4$, $X_5$, $X_6$ and $X_7$ in the above general formula (2) may be identical to one another or different from one another, and each means a functional group or atom. Preferred examples of the functional groups or atoms include hydrogen atom, a halogen atom, an amino group, an alkyl group, an alkoxy group, a thioalkyl group, an alkylamino group, an aryl group, an arylamino group, a vinyl group, a siloxy group, an organo-siloxy group, an organo-silyl group, a heterocylic group (e.g., pyridyl group) and so on. Although the number of the carbon atoms in the alkyl group, the alkoxy group, the thioalkyl group, the alkylamino group, the organo-siloxy group, the organo-silyl group and so on is not particularly limited, it is preferably one to eight carbon atoms. For the functional groups or atoms represented by each of reference symbols $X_1$ to $X_7$ in the above general formulas (1) and (2), a lower alkyl group having one to four carbon atoms (particularly methyl) and a phenyl group are particularly preferred. As can be understood from the general formulas (1) and (2), the structural feature of the silane compounds resides in that they have at least one Si—H bond. The silane compounds of the general formulas (1) and (2) are readily available as known compounds.

Out of the silane compounds represented by the general formulas (1) and (2), the silane compounds represented by the general formula (2) are generally preferred because they can be used in a lower concentration. The particularly preferred examples of the silane compounds may include a silane compound having an alkylene structure, which corresponds to the desired polysilalkylenesiloxane, in which reference symbol a (formula (2)) is identical to reference symbol b (formula (4)). For example, the silane compound represented by the formula: $H(CH_2)_2Si(CH_2)_2Si(CH_3)_2H$ (tetramethylsilethylene), may preferably be used as a co-catalyst for the preparation of a polysilethylenesiloxane.

The ring opening polymerization to be applied in the method according to the present invention may be carried out in a non-aqueous solvent under neutral conditions by using the catalyst and the silane compound as illustrated above. Appropriate examples of such solvent include benzene, toluene, dichloromethane, diethylether, and so on. The ring opening polymerization can be carried out under ambient pressure or reduced pressure at a temperature in the range of 5° C. to 80° C., preferably of 30° C. to 50° C., for a reaction time in the range of 2 hours to 100 hours, preferably of 2 hours to 50 hours.

The molecular weight of the polymer obtained by the polymerization of the present invention is not particularly limited, although it generally falls in the approximate range of 500 to 500,000 as a number-average molecular weight. The method according to the present invention is characterized in that the molecular weight of the resulting target polymer can be controlled simply by using the polynuclear ruthenium-carbonyl complex as the catalyst and the silane compound, without use of a chain transfer agent. Generally, the molecular weight of the resulting polymer can be rendered smaller by using the monomer in a lower concentration. Moreover, the molecular weight of the resulting polymer can also be reduced by adding a non-protonic solvent such as acetone. The polymer resulting from the method of the present invention has a narrow molecular weight distribution such that the Mw/Mn ratio (wherein Mw is the weight-average molecular weight and Mn is the number-average molecular weight) is generally in the range of 1.3 to 2.6. The resulting polymer may have a hydrogen atom at either end under usual conditions and a hydroxyl group when water is present in the reaction system.

EXAMPLES

In order to more clearly define the features of the present invention, the method according to the present invention will be described by way of specific working examples. It should be understood, however, that the present invention is not in any respect limited by the working examples. Further, it is to be understood that the representation of carbon atoms and hydrogen atoms may be omitted from the chemical structure formulas indicated in this description, in accordance with customary way of representing chemical formulas.

Example 1

This example is intended to illustrate a ring opening polymerization according to the present invention and to describe the process of the analysis of the resulting polymer.

A thick-wall NMR tube having a diameter of 5 mm, equipped with a common ground joint, was charged with 43 mg (0.27 mmol) of a five-membered cyclic silethylenesiloxane monomer as represented by the following formula (12), 30 mg (0.27 mmol) of dimethylphenylhydrosilane (a silane compound), 1.7 mg ($2.7 \times 10^3$ mmol) of three-nuclear ruthenium-heptacarbonyl complex represented by the formula (5) above (a catalyst) and 0.53 g of deuterated benzene ($C_6D_6$), and the NMR tube was then sealed after deaeration.

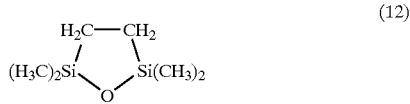

Then, the NMR tube was warmed at 40° C. with sting. After keeping for three hours at 40° C., the tube was allowed to cool to room temperature and then opened, followed by addition of 0.3 g of diethylether to dissolve the polymer formed. The resulting solution was transferred to a flask and the deuterated benzene and the non-reacted silane compound were distilled off at room temperature and at reduced pressure of 0.003 mmHg for 12 hours to yield an oily material in the amount of about 50 mg.

The resulting oily material was subjected to measurements by means of GPC (Gel Permeation Chromatography), infrared absorption spectrum analysis, $^1H$ NMR, $^{13}C$ NMR, and $^{29}Si$ NMR. The results of the measurements are indicated below.

GPC
　Device: Column oven: SHIMADZU CTO-10A;
　　Pump: JASCO PU980;
　　Column: Shodex KF 804L+KF 805L (each one column)
　Measuring conditions:
　　Solvent: Tethrahydrofuran
　　Flow rate: 1 ml/min
　　Detector: Differential refractometer
　　Temperature: 40° C.
　　Calibration: polystyrene standard×8 kinds The resulting chart is indicated in FIG. 1. As is apparent from this chart, the GPC indicates a pattern of a single distribution mode.

Figure 2:
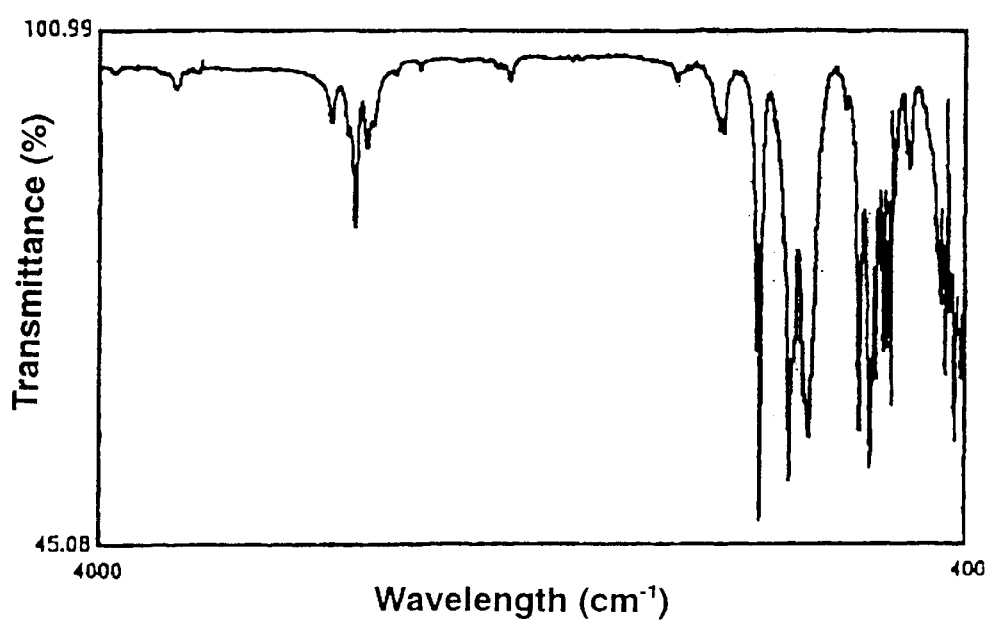
FIG. 2 is an infrared absorption spectrum of the polymer synthesized by the method according to the present invention.

Infrared Absorption Spectrum
The infrared absorption spectrum chart is indicated in FIG. 2.
　SiO: 1048 $cm^1$
　$SiCH_3$: 1257 $cm^1$
$^1H$ NMR: in $C_6D_6$ Inner Reference $C_6H_6$
　δ (ppm)
　0.21 (s, $SiCH_3$, 12H)
　0.65 (s, $SiCH_2$, 4H)
$^{13}C$ NMR: in $C_6D_6$, Inner Reference $C_6D_6$
　δ (ppm)
　0.04 ($SiCH_3$)
　10.26 ($SiCH_2$)
$^{29}Si$ NMR: in $C_6D_6$, Inner Reference TMS
　δ (ppm) 8.25

From these results, it was confirmed that the oily material was identical to the polymer represented by the following formula (13):

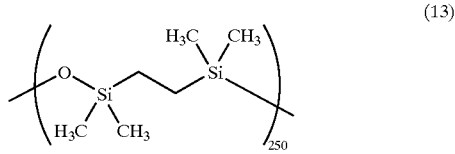

Example 2

This example is intended to illustrate the case where the yield of the resulting polymer can be increased by increasing the charging amount of the monomer (50 times) and decreasing the charging amount of the solvent, as compared with Example 1.

A thick-wall ampoule tube having a diameter of 15 mm, equipped with a common ground joint, was charged with 2.13 g (13.3 mmol) of cyclic silethylenesiloxane represented by the formula (12) above, 1.81 g (13.3 mmol) of dimethylphenylhydrosilane (a silane compound), 0.87 mg ($1.3 \times 10^3$ mmol) of a ruthenium-carbonyl complex (a catalyst) represented by the formula (5) above, and 0.27 g of benzene, and the ampoule tube was then sealed after deaeration. Then, the tube was warmed at 40° C. with strring. After keeping at this temperature for three hours, the tube was allowed to cool to room temperature and then opened, followed by addition of 0.3 g of diethylether to dissolve the formed polymer. The resulting solution was transferred to a flask, and benzene and the non-reacted silane compound were distilled off at room temperature and 0.003 mmHg for 12 hours yielding an oily material in the amount of 2.17 g.

The resulting oily material was analyzed by GPC, infrared absorption spectrum analysis and NMR in substantially the same manner as in Example 1. The measurements revealed that the oily material was similar to the polymer obtained in Example 1.

Example 3

Experiments were carried out in substantially the same manner as in Example 1 but under varying reaction conditions as indicated in Table 1 below, in order to produce a linear polysilalkylenesiloxane from the corresponding cyclic silethylenesiloxane by means of ring opening polymerization. The results are also shown in Table 1.

In Table 1 above, the relative silane concentration (the relative silane compound concentration) and the relative catalyst concentration are each represented as a molar ratio with respect to the monomer used.

In Table 1 above, Run No. 1 indicates the results obtained in Example 1 under the standard conditions and Run No. 5 indicates the results obtained in Example 2. Run No. 2 indicates the results when the concentration of the silane compound was increased to five times the concentration thereof used in Example 1 (confirmed in 30 minutes after the completion of the reaction). Run No. 3 indicates the results when a cobalt complex. $Co_2(CO)_8$ was used as a catalyst, in place of a ruthenium catalyst. Run No. 4 indicates the results when argon gas was used at one atmospheric pressure, not under reduced pressure as in Example 1. Run No. 6 indicates the results of a control experiment in which neither catalyst nor silane compound used; 80° C.; Run No. 7 indicates the results of a control experiment in which no catalyst used; and Run No. 8 indicates the results of a control experiment in which no silane compound used. Run Nos. 9–11 indicate the results when a variety of the polynuclear ruthenium-carbonyl complexes were used as a catalyst, other than the complex as represented by the formula (5).

As is indicated in Table 1, the method according to the present invention (Run Nos. 1, 2, 4, 5, 9, 10 and 11) can provide the polymers corresponding to the cyclic monomers used as a raw materials by means of the ring opening polymerization reaction using the polynuclear ruthenium-carbonyl complex as a catalyst in the presence of the silane compound having a Si—H bond. On the other hand, the reaction using neither catalyst (polynuclear ruthenium-carbonyl complex) nor silane compound, unlike the method of the present invention, cannot induce any ring opening polymerization and, as a consequence, cannot provide any polymer.

TABLE 1

| Run No. | Relative Monomer Concentration | Relative Silane Concentration | Catalyst | Relative Catalyst Concentration | Monomer/ $C_6D_6$ (mol/l) | Reaction Temperature (° C.) | Monomer Conversion (%) | Mn $(\times 10^3)$[b] | Mw/Mn[b] |
|---|---|---|---|---|---|---|---|---|---|
| 1 | 1 | 1 | Formula (5) | 0.01 | 0.53 | 40 | 100 | 35 | 2.3 |
| 2 | 1 | 5 | Formula (5) | 0.01 | 0.53 | 40 | 100 | 35 | 2.6 |
| 3 | 1 | 1 | $Co_2(CO)_8$ | 0.01 | 0.53 | 40 | 0 | — | — |
| 4 | 1 | 1 | Formula (5) | 0.01 | 0.53 | 40 | 100 | 7 | 1.6 |
| 5 | 1 | 1 | Formula (5) | 0.001 | 44 | 40 | 100 | 56 | 1.3 |
| 6 | 1 | — | Formula (5) | — | 0.53 | 80 | 0 | — | — |
| 7 | 1 | 1 | Formula (5) | — | 7 | 40 | 0 | — | — |
| 8 | 1 | — | Formula (5) | 0.001 | 7 | 40 | 0 | — | — |
| 9 | 1 | 1 | Formula (7) | 0.001 | 0.53 | 40 | 100 | 39 | 2.1 |
| 10 | 1 | 1 | Formula (6) | 0.001 | 0.53 | 40 | 100 | 73 | 2.6 |
| 11 | 1 | 1 | Formula (9) | 0.001 | 0.53 | 40 | 100 | 56 | 2.1 |

Notes:
[a]Computed from $^1$H NMR;
[b]computed from GPC.

Example 4

This example is intended to illustrate the case where the molecular weight of the resulting polymer can be controlled by using acetone.

A NMR tube was charged with 43 mg (0.27 mmol) of silethylenesiloxane (a monomer) represented by the formula (12), 36 mg (0.27 mmol) of dimethylphenylsilane (a silane compound), 0.174 mg ($2.7 \times 10^4$ mmol) of three-nuclear ruthenium-heptacarbonyl complex (a catalyst) represented by the formula (5), 0.5 ml of $C_6D_6$, and 16 mg (0.27 mmol) of acetone (a transfer agent). The NMR tube was then sealed and warmed at 40° C. for 18 hours while following the progress of the reaction by means of $^1$H NMR. After the completion of the reaction, the solvent was removed off under reduced pressure yielding an oily material in the amount of 45 mg. The molecular weight and the molecular weight distribution (Mw/Mm) of the resulting polymer were found to be 4,200 and 1.3, respectively, as measured by means of the GPC using polystyrene standard. The methyl moiety (0.215 ppm) and the methylene moiety (0.656 ppm) of the main polymer chain were confirmed by means of the analysis of $^1$H NMR, and multiple lines were observed at 3.90 ppm, which suggests the presence of a terminal isopropoxy group. This indicates that the molecular weight of the resulting polymer decreased owing to the action of acetone as a molecular weight adjusting agent.

When the amount of acetone was reduced to half and the reaction was carried out in substantially the same manner as above, it was found that the obtained polymer had a molecular weight of 21,000 and a molecular weight distribution of 2.6.

Example 5

This example is intended to demonstrate that the concentration of the silane compound can be decreased when the silane compound used is tetramethyldisilethylene, $H(CH_3)_2Si(CH_2)_2Si(CH_3)_2H$, which is one of the compounds represented by the general formula (2) above.

A NMR tube was charged with 43 mg (0.27 mmol) of cyclic silethylenesiloxane (a monomer) represented by the formula (12), 0.39 mg (0.0027 mmol) of tetramethyldisilsiloxane (a silane compound), 0.174 mg ($2.7 \times 10^4$ mmol) of tri-nuclear ruthenium-heptacarbonyl complex (a catalyst) represented by the formula (5), and 0.5 ml of $C_6D_6$. The NMR tube was then sealed and warmed at 40° C. for 18 hours. Thus, the relative silane compound concentration was 0.01 and the relative catalyst concentration was 0.001. During the reaction, the progress of the reaction was followed by means of $^1$H NMR. After the completion of the reaction, the solvent was removed off under reduced pressure yielding an oily material in the amount of 42 mg. The molecular weight and the molecular weight distribution (Mw/Mn) of the resulting polymer were found to be 157,000 and 1.8, respectively, by means of the GPC measurement using polystyrene standard. The methyl moiety (0.215 ppm) and the methylene moiety (0.656 ppm) of the main polymer chain were confirmed by means of the analysis of $^1$H NMR.

Example 6

This example is intended to illustrate the case where the molecular weight of the resulting polymer can also be controlled by varying the concentration of the monomer used. The polymerization was carried out in substantially the same manner as in Example 5 by using tetramethylenedisilethylene as the silane compound, except that the amount of the solvent ($C_6D$) and the concentration of the monomer (cyclic silethylenesiloxane) were changed. The results are indicated in Table 2. From Table 2, it was found that the molecular weight of the resulting polymer was reduced by reducing the concentration of the monomer.

TABLE 2

| RUN No. | Relative Monomer Concentration | Relative Silane Concentration | Relative Catalyst Concentration | Monomer/ $C_6D_6$ (mol/l) | Reaction Temperature (° C.) | Monomer Conversion (%) | Mn $(\times 10^3)$ | Mw/Mn | Reaction Time (h) |
|---|---|---|---|---|---|---|---|---|---|
| 1 | 1 | 1 | 0.001 | 0.53 | 40 | 100 | 132 | 2.3 | 19 |
| 2 | 1 | 1 | 0.001 | 0.27 | 40 | 100 | 62 | 2.7 | 10.5 |
| 3 | 1 | 1 | 0.001 | 0.053 | 40 | 80 | 7.6 | 1.5 | 34 |

INDUSTRIAL UTILIZABILITY

The present invention can provide a linear polysiloxane by subjecting the corresponding cyclic siloxane, e.g., cyclic silethylenesiloxane, to ring opening polymerization, under neutral and mild conditions by using the polynuclear ruthenium-carbonyl complex as a catalyst and the silane compound in the manner as described above.

The resulting polymer, e.g., polysilethylenesiloxane can be used in diverse fields including rubber, greases, electronic materials, and so on because it is highly resistant particularly to acid and alkali, and has high mechanical strength.

What is claimed is:

1. A method for the preparation of a linear polysilalkylenesiloxane having a repeating unit represented by the following general formula (4):

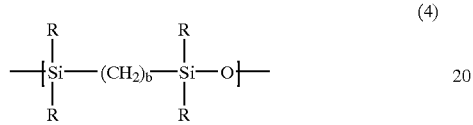
(4)

(where b is an integer of 1 to 4; and R is a hydrocarbon group of from 1 to 8 carbon atoms)
which comprises subjecting a cyclic silalkylenesiloxane represented by the following general formula (3):

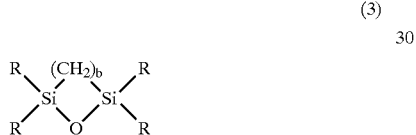
(3)

(where b and R have each the same meaning as above) to ring opening polymerization by using as a catalyst a polynuclear ruthenium-carbonyl complex with carbonyl groups coordinated with three or four ruthenium atoms, in the presence of a silane compound represented by the following general formula (1):

(1)

(where $X_1$, $X_2$ and $X_3$ are the same or different, each being a functional group or atom selected from a group consisting of hydrogen atom, a halogen atom, an amino group, an alkyl group, an alkoxy group, a thioalkyl group, an alkylamino group, an aryl group, an arylamino group, a vinyl group, a siloxy group, an organo-siloxy group, an organo-silyl group and a heterocyclic group)
or by the following general formula (2):

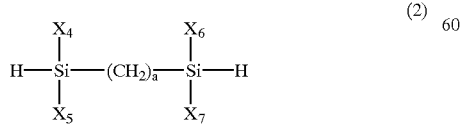
(2)

(where $X_4$, $X_5$, $X_6$ and $X_7$ are the same or different, each being a functional group or atom selected from a group consisting of hydrogen atom, a halogen atom, an amino group, an alkyl group, an alkoxy group, a thioalkyl group, an alkylamino group, an aryl group, an arylamino group, a vinyl group, a siloxy group, an organo-siloxy group, an organo-silyl group and a heterocyclic group; and a is an integer of 1 to 4).

2. The method as claimed in claim 1, wherein said catalyst is a polynuclear ruthenium-carbonyl complex selected from those represented by the following formulas (5) to (9):

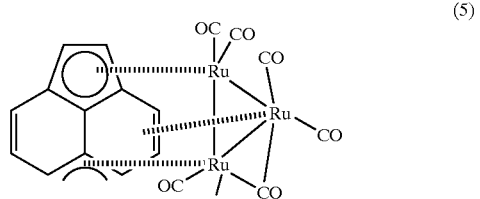
(5)

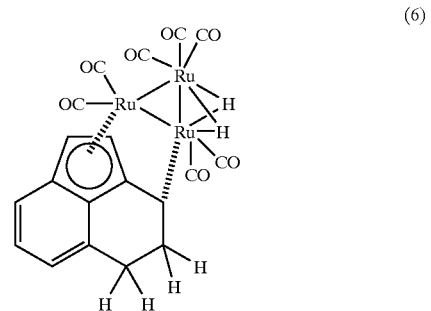
(6)

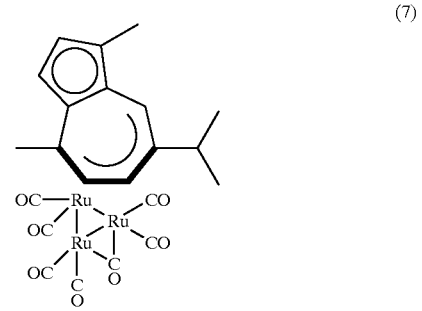
(7)

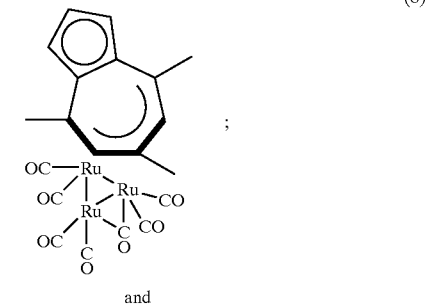
(8)

and

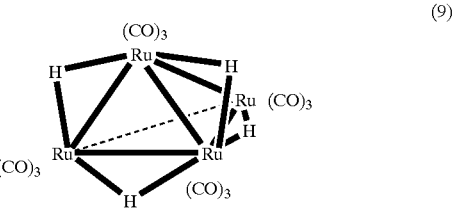
(9)

3. The method as claimed in claim 2, wherein said silalkylenesiloxane used as a raw material is a silethylenesiloxane represented by the general formula (10):

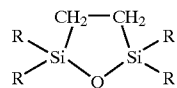
(10)

(where R has the same meaning as above)

and the polysilethylenesiloxane having a repeating unit represented by the general formula (11):

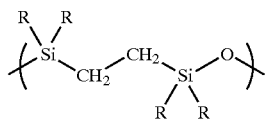
(11)

(where R has the same meaning as above)
is formed.

4. The method as claimed in claim 3, where said silane compound is the one represented by the formula: $H(CH_3)_2Si(CH_2)_2Si(CH_3)_2H$.

5. The method as claimed in claim 4, where R is methyl.

* * * * *